Figure 1:
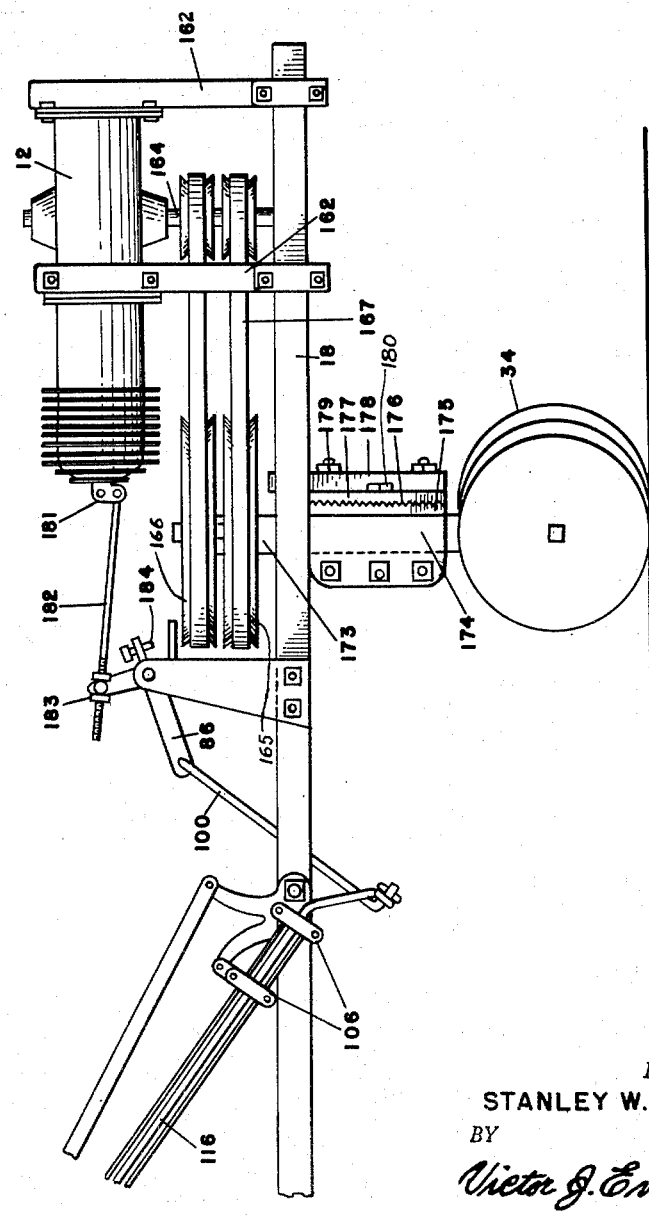

Dec. 26, 1950  S. W. SHAW  2,535,701
GARDEN TRACTOR

Filed May 29, 1945  2 Sheets-Sheet 1

INVENTOR.
STANLEY W. SHAW
BY
*Victor J. Evans & Co.*
ATTORNEYS

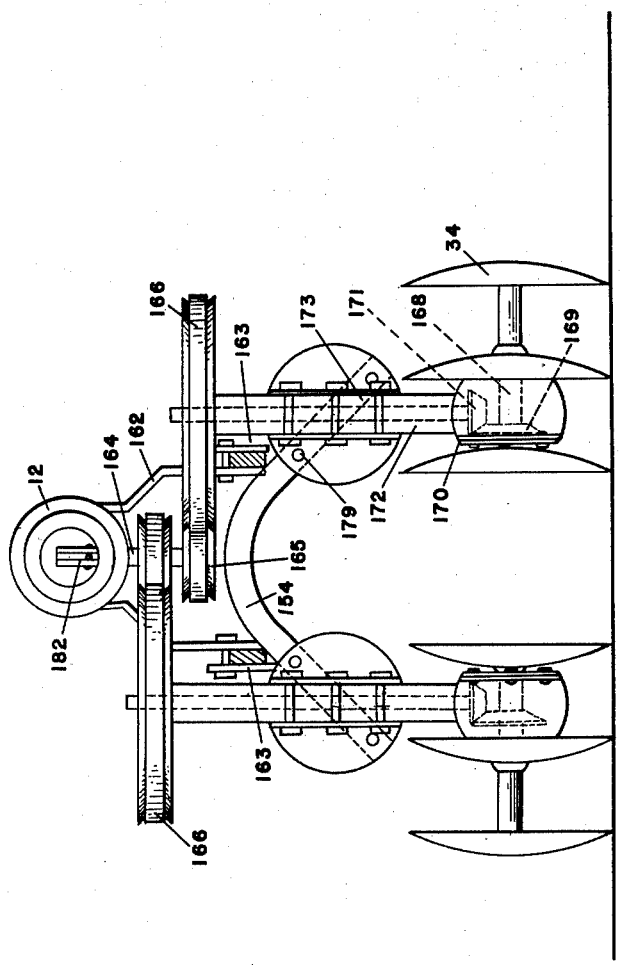

Patented Dec. 26, 1950

2,535,701

UNITED STATES PATENT OFFICE 2,535,701

GARDEN TRACTOR

Stanley W. Shaw, Galesburg, Kans.

Application May 29, 1945, Serial No. 596,441

4 Claims. (Cl. 97—40)

My invention relates to garden cultivators, and has among its objects and advantages the provision of an improved motor driven cultivator including novel means for connecting and disconnecting the motor with respect to the propelling facilities, together with novel means for adjusting the ground working tools with respect to angularity and with respect to spacing for straddling rows or cultivating therebetween.

In the accompanying drawings:

Figure 1 is a side elevation of my invention wherein the discs of the cultivator are actuated by a bevel gear drive mechanism, and wherein the motor is mounted on the cultivator to relieve tension on the belts to the bevel gear drive shafts, and Figure 2 is a front elevation of the cultivator as shown in Figure 1.

In Figures 1 and 2, I have illustrated a form of my invention wherein a beveled gear drive is provided for the disk wheels, and a form of adjustment of the engine is provided to induce slack in the belts as well as a form of mechanism for adjusting the disks in an angular direction. I provide spaced frame members 18 on which the engine 12 is mounted, there being forward and rear engine supporting straps 162 bolted over and under the members 18 to cleats 163 so that the engine may be moved in the manner hereinafter appearing. The engine has a vertical drive shaft 164 carrying upper and lower small drive pulleys 165 which respectively are connected to right hand and left hand driven pulleys 166 by V-belts 167 for the drive gears of the disks 34. Each disk gang 34 has a shaft 168 carrying a beveled gear 169 which is housed in a gear case 170. Each gear case 170 has a cover plate, and the cases serve as grease containers. Each bevel gear 169 meshes with a bevel gear 171 on shaft 172 mounted in the vertical casing 173, and at the top end of each shaft is mounted pulley 166 thereby to drive the disks from the engine 12. Engaging about each vertical casing or sleeve 173 is a clamping support bracket 174 carrying a disk 175 formed with teeth 176 which engage teeth 177 on companion disk support bracket 178 which is attached by bolts 179 to the arch 154 welded to frame member 18. The disk support elements 175—178 are held together by bolts 180 so that their relationship may be adjusted to adjust the angular relation of the disk gangs 34 with respect to the ground. The disk gangs 34 may be pivoted about the shaft 172 at any angle for operation since the teeth of beveled gears 169 and 171 remain in mesh, and it is merely necessary to adjust sleeves or casings 173. In order to remove or relieve the tension on belts 167 the engine 12 is movable with respect to the frame members 18 as heretofore indicated, and to that end is provided with an end bracket 181 connected with rod 182 which in turn is attached by an adjustable coupling 183 to the bell-crank 86. Bearings 106 mounted on steering arm 108 and right angular handle 110 which in turn is coupled to crank rod 104 coupled to rod 100 connected with the bell-crank 86 so that oscillation of the handle 110 is translated into movement of the engine 12. A stop pin 184 is provided for the bell-crank. In operation the implement operates successfully in most soils without the aid of means for limiting the cultivating depth of the disc guide. The weight of the implement is sufficient to cause the disc to penetrate the soil to a desirable depth. The discs are rotated by the engine to impart propelling motion for the implement. From the foregoing, it is believed the operation and advantages of this form will be apparent.

Without further elaboration, the foregoing will so fully illustrate my invention, that others may, by applying current knowledge, readily adapt the same for use under various conditions of service.

I claim:

1. An agricultural implement comprising a frame, an engine mounted upon the frame for horizontal adjustment with respect thereto, said engine being laid on its side and having its output shaft depending downwardly therefrom, drive pulleys connected to the shaft one above the other and extending in horizontal planes, handle portions extending upwardly from the frame, linkage means extending between the handle portions and the engine to adjust the same on the frame, soil tilling gangs connected to the opposite sides of the frame for supporting the same, and drive means extending vertically from the soil tilling gangs to effect their rotation to propel the implement and means extending from the drive pulley of the engine horizontally and laterally for connection with the vertically extending driving means of the respective gangs.

2. An agricultural implement as defined in claim 1, wherein said vertically extending means for driving the respective gangs comprises a pair of vertically extending shafts, one for each gang, each shaft with a bevel gear on its lower end adapted to drive a bevel gear associated with one of the gangs, and a pulley wheel on the upper end of each vertically extending shaft, the pulley of one vertical shaft being at a different elevation than the pulley of the other vertical shaft, each pulley corresponding respectively to one of the pulleys of the engine shaft, said drive pulleys of the engine being mounted one above the other and belts respectively extending to the pulleys of the vertically extending shafts which drive the gangs.

3. An agricultural implement as defined in claim 1, wherein said frame includes a U-shaped member having downwardly and outwardly inclined legs, and vertically extending sleeves having an enlarged casing on their bottom ends, means extending through the sleeves forming the driving means, and means for adjustably connecting the respective sleeves of the respective gangs to the respective ends of the inverted U-shaped member for angular adjustment about both vertical and horizontal axes.

4. An agricultural implement as defined in claim 1, including means for connecting the soil tilling gangs to the opposite sides of the frame for angular adjustment about both vertical and horizontal axes.

STANLEY W. SHAW.

REFERENCES CITED

The following references are of record in the file of this patent:

UNITED STATES PATENTS

| Number | Name | Date |
|---|---|---|
| Re. 12,575 | Kurtz | Dec. 11, 1906 |
| 752,306 | Somerville | Feb. 16, 1904 |
| 789,528 | Cook et al. | May 9, 1905 |
| 975,305 | Wait | Nov. 8, 1910 |
| 979,782 | McLean | Dec. 27, 1910 |
| 1,124,162 | Monahan | Jan. 15, 1915 |
| 1,419,722 | Dittmar | June 13, 1922 |
| 1,486,548 | Schrum | Mar. 11, 1924 |
| 1,489,952 | Lawson | Apr. 8, 1924 |
| 1,625,829 | Shaw | Apr. 26, 1927 |
| 1,823,529 | Cathey | Sept. 15, 1931 |
| 1,843,863 | Burch | Feb. 2, 1932 |
| 2,082,600 | Squires et al. | June 1, 1937 |
| 2,166,450 | Smalley | July 18, 1939 |
| 2,260,344 | Shaw | Oct. 28, 1941 |
| 2,388,981 | Kuntz | Nov. 13, 1945 |